United States Patent
Ewe et al.

(10) Patent No.: US 11,365,625 B2
(45) Date of Patent: Jun. 21, 2022

(54) DETERMINING BROADBAND MUD PROPERTIES

(71) Applicant: Halliburton Energy Services, Inc., Houston, TX (US)

(72) Inventors: Wei-Bin Ewe, Singapore (SG); Ruijia Wang, Singapore (SG); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 332 days.

(21) Appl. No.: 16/595,636

(22) Filed: Oct. 8, 2019

(65) Prior Publication Data

US 2021/0102459 A1     Apr. 8, 2021

(51) Int. Cl.
| | |
|---|---|
| G06F 11/30 | (2006.01) |
| E21B 49/00 | (2006.01) |
| G01V 3/18 | (2006.01) |
| G01V 3/38 | (2006.01) |
| E21B 47/01 | (2012.01) |

(52) U.S. Cl.
CPC ............ *E21B 49/005* (2013.01); *E21B 47/01* (2013.01); *G01V 3/18* (2013.01); *G01V 3/38* (2013.01)

(58) Field of Classification Search
CPC .................................................. E21B 49/005
See application file for complete search history.

(56) References Cited

U.S. PATENT DOCUMENTS

| 3,060,373 A | 10/1962 | Doll |
| 3,132,298 A | 5/1964 | Doll et al. |

(Continued)

FOREIGN PATENT DOCUMENTS

| CA | 685727 | 5/1964 |
| EP | 2594735 | 7/2014 |

(Continued)

OTHER PUBLICATIONS

SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.

(Continued)

*Primary Examiner* — Phuong Huynh
(74) *Attorney, Agent, or Firm* — John Wustenberg; C. Tumey Law Group PLLC

(57) ABSTRACT

A method for determining mud properties may comprise taking multi-frequency measurement data with a downhole tool, selecting an injector electrode from the one or more injector electrodes for the multi-frequency measurement data, selecting data from the multi-frequency measurement data with low resistivity or a large standoff, creating a forward model based at least partially on the selected data by making initial guesses of model parameters for one or more mud properties, performing a cost function minimization with the forward model, identifying from the cost function minimization if a misfit is above or below a threshold, and identifying the one or more mud properties based at least in part on the cost function minimization. A system may comprise a downhole tool including a mandrel, one or more arms, one or more pads, and one or more injector electrodes. The system may further include an information handling system.

24 Claims, 13 Drawing Sheets

(56) References Cited

U.S. PATENT DOCUMENTS

| | | |
|---|---|---|
| 3,379,963 A | 4/1968 | Saurenman |
| 3,379,964 A | 4/1968 | Segesman |
| 3,579,098 A | 5/1971 | Mougne |
| 4,251,773 A | 2/1981 | Cailliau et al. |
| 4,468,623 A | 8/1984 | Gianzero et al. |
| 4,545,242 A | 10/1985 | Chan |
| 4,567,759 A | 2/1986 | Ekstrom et al. |
| 4,692,908 A | 9/1987 | Ekstrom et al. |
| 4,851,781 A | 7/1989 | Marzetta et al. |
| 4,862,090 A | 8/1989 | Vannier et al. |
| 5,008,625 A | 4/1991 | Chen |
| 5,012,193 A | 4/1991 | Chen |
| 5,038,378 A | 8/1991 | Chen |
| 6,191,588 B1 | 2/2001 | Chen |
| RE42,493 E | 6/2011 | Tabarovsky et al. |
| 8,579,037 B2 | 11/2013 | Jacob |
| 9,678,239 B2 | 5/2017 | Habashy et al. |
| 2009/0005993 A1* | 1/2009 | Abubakar .............. G01V 11/00 702/7 |
| 2010/0039115 A1 | 2/2010 | Bespalov et al. |
| 2014/0239960 A1 | 8/2014 | Habashy et al. |
| 2014/0347056 A1* | 11/2014 | Hayman ................ G01V 13/00 324/355 |
| 2015/0185354 A1 | 7/2015 | Hayman |

FOREIGN PATENT DOCUMENTS

| | | |
|---|---|---|
| WO | 2019060722 | 3/2019 |
| WO | 2019088988 | 5/2019 |
| WO | 2019088998 | 5/2019 |
| WO | 2019177588 | 9/2019 |

OTHER PUBLICATIONS

Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.
International Search Report and Written Opinion for Application No. PCT/US2019/056096, dated Jul. 6, 2020.
Y.H. Chen et al., Inversion-Based Workflow for Quantitative Interpretation of the New-Generation Oil-Based Mud Resistivity Imager, SPWLA, May 2014.

* cited by examiner

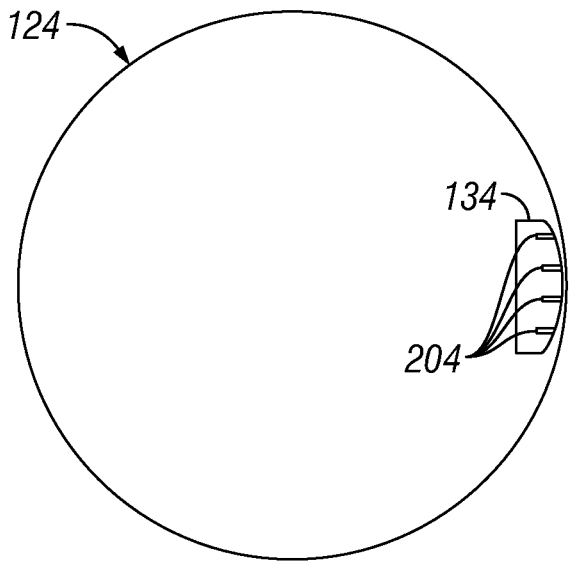
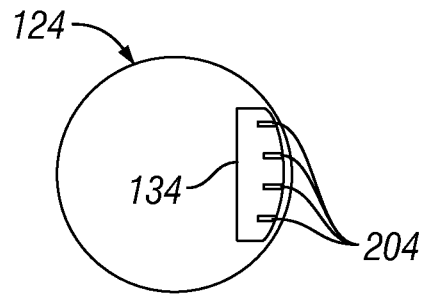
FIG. 6A
FIG. 6B
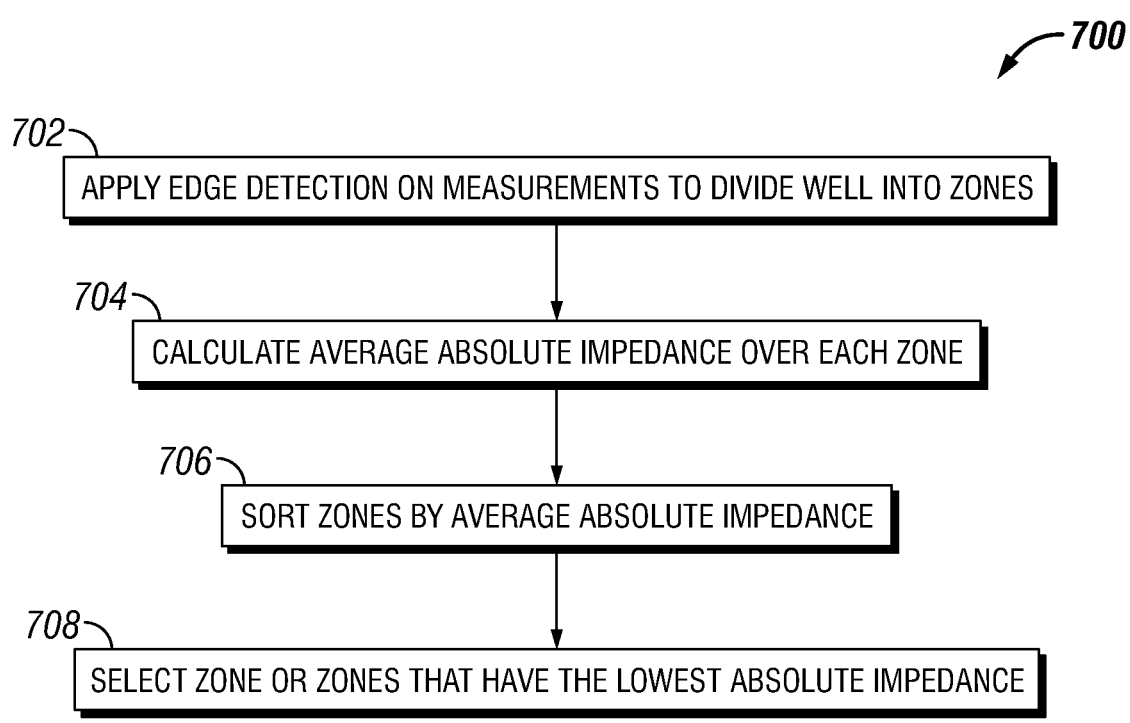
FIG. 7

US 11,365,625 B2

DETERMINING BROADBAND MUD PROPERTIES

BACKGROUND

Boreholes drilled into subterranean formations may enable recovery of desirable fluids (e.g., hydrocarbons) using a number of different techniques. A downhole tool may be employed in subterranean operations to determine borehole and/or formation properties. Traditionally, borehole imager tools may be used in obtaining a detailed characterization of reservoirs. These borehole imager tools may provide a resistivity image of the formation immediately surrounding the borehole. Generally, the imager tool forms a resistivity image from multi-frequency measurement data. Borehole imager tools may be used to determine formation stratigraphy, dips of the formation layers as well as, borehole and formation stress. During drilling operations borehole imager tools may be particularly important in learning about thin beds, fracture locations, and low resistivity formations. However, downhole oil-based mud properties are needed in order to estimate accurately the formation resistivity and permittivity that have been measured by the borehole imager tool. Most imager tools do not have a mud cell to determine oil-based mud properties. It may be beneficial to determine oil-based mud properties from previously taken frequency measurements and downhole information.

BRIEF DESCRIPTION OF THE DRAWINGS

These drawings illustrate certain aspects of some of the present disclosure and should not be used to limit or define the disclosure.

FIG. 6A illustrates a borehole radius that is larger than the pad surface radius;

FIG. 6B illustrates a borehole radius that is smaller than a pad surface radius;

FIG. 7 illustrates an example workflow for selecting low resistivity zones;

DETAILED DESCRIPTION

The present disclosure relates generally to a system and method for determining oil-based mud properties. During logging operations, measurement data may contain a contribution from the oil-based mud that is present between a pad surface and the wall of a borehole in addition to the signal coming from the formation itself. Therefore, the oil-based mud properties need to be first determined in order to remove its effect form the measurement for subsequent processing to obtain formation resistivity and permittivity.

Figure 1:
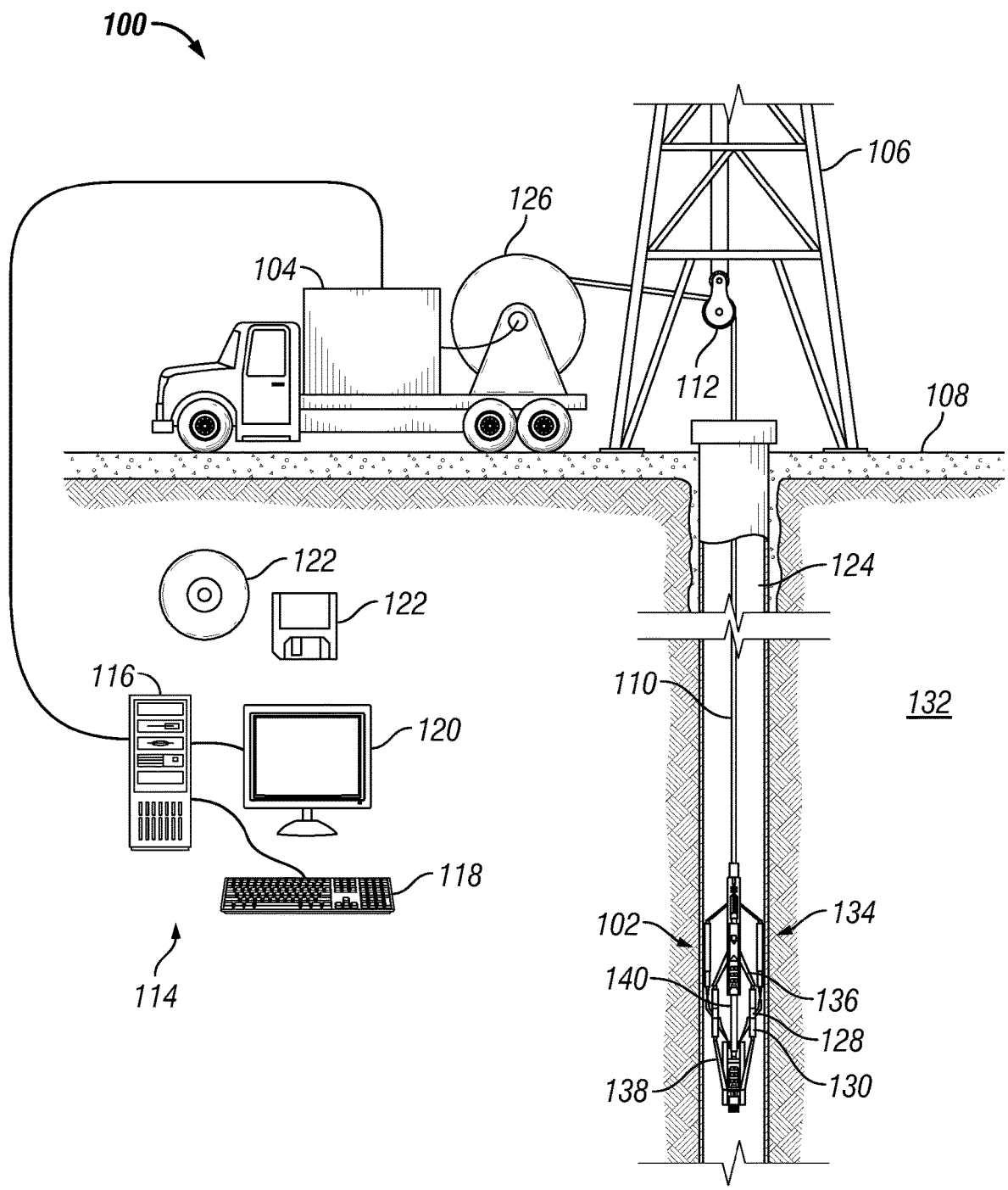
FIG. 1 illustrate an example of a well measurement system.

FIG. 1 illustrates a cross-sectional view of a well measurement system 100 in accordance with some embodiments. As illustrated, well measurement system 100 may include downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102.

Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102.

Conveyance 110 may lower downhole tool 102 in borehole 124. Generally, borehole 124 may include horizontal, vertical, slanted, curved, and other types of borehole geometries and orientations. Imaging tools may be used in uncased sections of the borehole. Measurements may be made by downhole tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high-resolution resistivity image of formation 132 immediately surrounding borehole 124. This high-resolution resistivity image may depict boundaries of subsurface structures, such as a plurality of layers disposed in formation 132. These formation images may be used in reservoir characterization. Formation images with high resolution may allow accurate identification of thin beds and other fine features such as fractures, clasts and vugs. These formation images may provide information about the sedimentology, lithology, porosity and permeability of formation 132. The formation images may complement, or in some cases replace, the process of coring.

In examples, rig 106 includes a load cell (not shown) which may determine the amount of pull on conveyance 110 at the surface of borehole 124. Information handling system 114 may include a safety valve which controls the hydraulic pressure that drives drum 126 on vehicle 104 which may reel up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may include a plurality of electrodes, such as button array 128. Downhole tool 102 may also include a return electrode 130. It should be noted that the plurality of electrodes disposed on button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may include both button array 128 and return electrodes 130. Pads 134 may attach to a mandrel 140 of downhole tool 102 through upper arm 136 and lower arm 138. It should be noted that mandrel 140 may be defined as the supporting structure of downhole tool 102 which may act as a platform for any peripheral (e.g., upper arm 136, lower arm 138, conveyance 110, etc.) to attach to downhole tool 102. Upper arm 136 and lower arm 138 may extend pad 134 away from downhole tool 102. In examples, both upper arm 136 and lower arm 138 may place pad 134 in contact with borehole 124. It should be noted that there may be any suitable number of arms and/or extensions that may be used to move pad 134 away from downhole tool 102 and in close proximity with borehole 124, or vice versa.

During operations, an operator may energize an individual electrode, or any number of electrodes, of button array 128. A voltage may be applied between the electrode and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 128. Therefore, current emitted by each electrode may be measured and recorded in order to obtain a formation image of the resistivity of formation 132.

To produce a resistivity image of formation 132, a current may be transmitted from at least one transmitter electrode and return to return electrode 130. These two electrodes may be referred to as the current electrodes. Then, the voltage drops across a pair of the electrodes of button array 128 may be measured and used to estimate the impedance of formation 132. In these alternative implementations, button electrodes may be referred to as voltage electrodes or monitor electrodes. Proposed method may operate in any of the two designs above or any other similar oil-based mud resistivity imager tool without any limitations.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed down hole in downhole tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, that may be used to process the measurements of downhole tool 102 before they may be transmitted to surface 108. Alternatively, raw measurements from downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
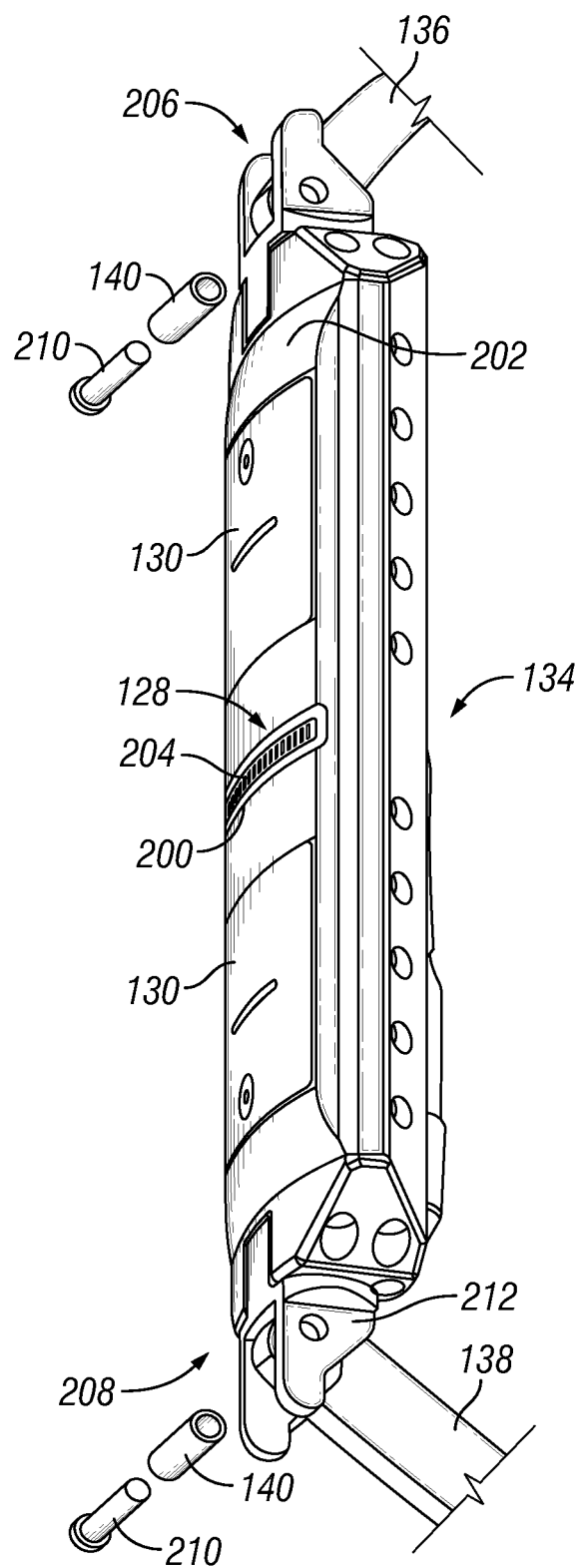
FIG. 2 illustrates an example of a pad.

FIG. 2 illustrates an example of pad 134. It should be noted that pad 134 may be connected to downhole tool 102 (e.g., referring to FIGS. 1 and 2). Pad 134 may serve to place button array 128 and/or return electrode 130 in contact with or in close proximity to borehole 124. Pad 134 may include a button array 128, a return electrode 130, a guard 200, and a housing 202. In examples, there may be a plurality of button arrays 128. In examples, return electrode 130 and button array 128 may be disposed directly on downhole tool 102. Button array 128 may include an injector electrode 204, wherein injector electrode 204 may be a sensor that senses impedance of formation 132. It should be noted that injector electrode 204 may be a button electrode. There may be any suitable number of injector electrodes 204 within button array 128 that may produce a desired, predetermined current. Without limitation, the range for a suitable number of injector electrodes 204 within button array 128 may be from about one injector electrode 204 to about one hundred injector electrodes 204. For example, the range for a suitable number of injector electrodes 204 within button array 128 may be from about one injector electrode 204 to about twenty-five injector electrodes 204, from about twenty-five injector electrodes 204 to about fifty injector electrodes 204, from about fifty injector electrodes 204 to about seventy-five injector electrodes 204, or from about seventy-five injector electrodes 204 to about one hundred injector electrodes 204.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. Without limitation, the distance from the center of one of the return electrodes to the button array may be from about one inch to about one foot. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each injector electrode 204 and return electrode 130. The level of the voltage may be controlled by information handling system 114. This may cause currents to be transmitted through button array 128. These currents may travel through the mud and formation 132 and may reach back to return electrode 130. The amount of current emitted by each injector electrode 204 may be inversely proportional to the impedance seen by that injector electrode 204. This impedance may be affected by the properties of formation 132 and the mud directly in front of each injector electrode 204. Therefore, current emitted by each injector electrode 204 may be measured and recorded in order to obtain an image of the resistivity of formation 132.

In examples, a current may be transmitted from injector electrode 204 and return to return electrode 130. These two electrodes may be referred to as the current electrodes. Then, the voltage drops across button array 128 may be measured and used to estimate the impedance of formation 132. In these alternative implementations, injector electrodes 204 may be referred to as voltage electrodes or monitor electrodes. Proposed method may operate in any of the two designs above or any other similar oil-based mud resistivity imager tool without any limitations. In the rest of the text, the imager tool will be assumed to be of the first design without any loss of generality.

Guard 200 may help to focus most of the current produced by button array 128 into formation 132 radially. Guard 200 may be disposed around button array 128. Guard 200 may include the same potential as button array 128.

In examples, housing 202 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 202 may be a metal plate. Housing 202 may be connected through upper arm 136 to downhole tool 102 (e.g., referring to FIG. 1). An insulating material may be used to fill the remaining portions of pad 134. In examples, ceramics may be used as the insulating material to fill the remaining portions of pad 134.

An impedance value may be calculated through the current transmitting between an injector electrode 204 and formation 132 for each injector electrode 204. The voltage between button array 128 and return electrodes 130 may be measured and divided by the transmitted current to produce a value for the impedance seen by each injector electrode 204. Most of the transmitted current may be returned to return electrodes 130 although some portions of it may return through housing 202 and downhole tool 102 (e.g., referring to FIG. 1).

During logging operations, measurement data taken by pad 134 may include resistivity and permittivity. Measurements of resistivity and permittivity may contain contributions from oil-based mud that is may be disposed between pad 134 and the wall of borehole 124 as well as the signal coming from the formation. To accurately estimate formation resistivity and formation permittivity, downhole oil-based mud properties may be measured. Currently, there is no mud cell used in downhole tool 102, thus downhole mud properties may be determined from measurements already taken by downhole tool 102. As discussed below, broadband oil-based mud properties may be determined from multi-frequency measurements data as well as physical borehole 124 and/or pad 134 information.

In general, the measurement medium of pad 134 may be modeled as a homogeneous formation with a thin layer of oil-based mud between pad 134 and formation 132. When pad 134 is placed on formation 132 without a mud layer, response measurement may only be from formation 132. However, when there is a mud layer present, the response is influenced by the thickness of the mud layer as well as the mud properties, in addition to the properties of formation 132 behind the mud layer. That being said, the response for certain formations 132 predominantly consist of the mud signal, which may make this response suitable for determining mud properties.

Figure 3:
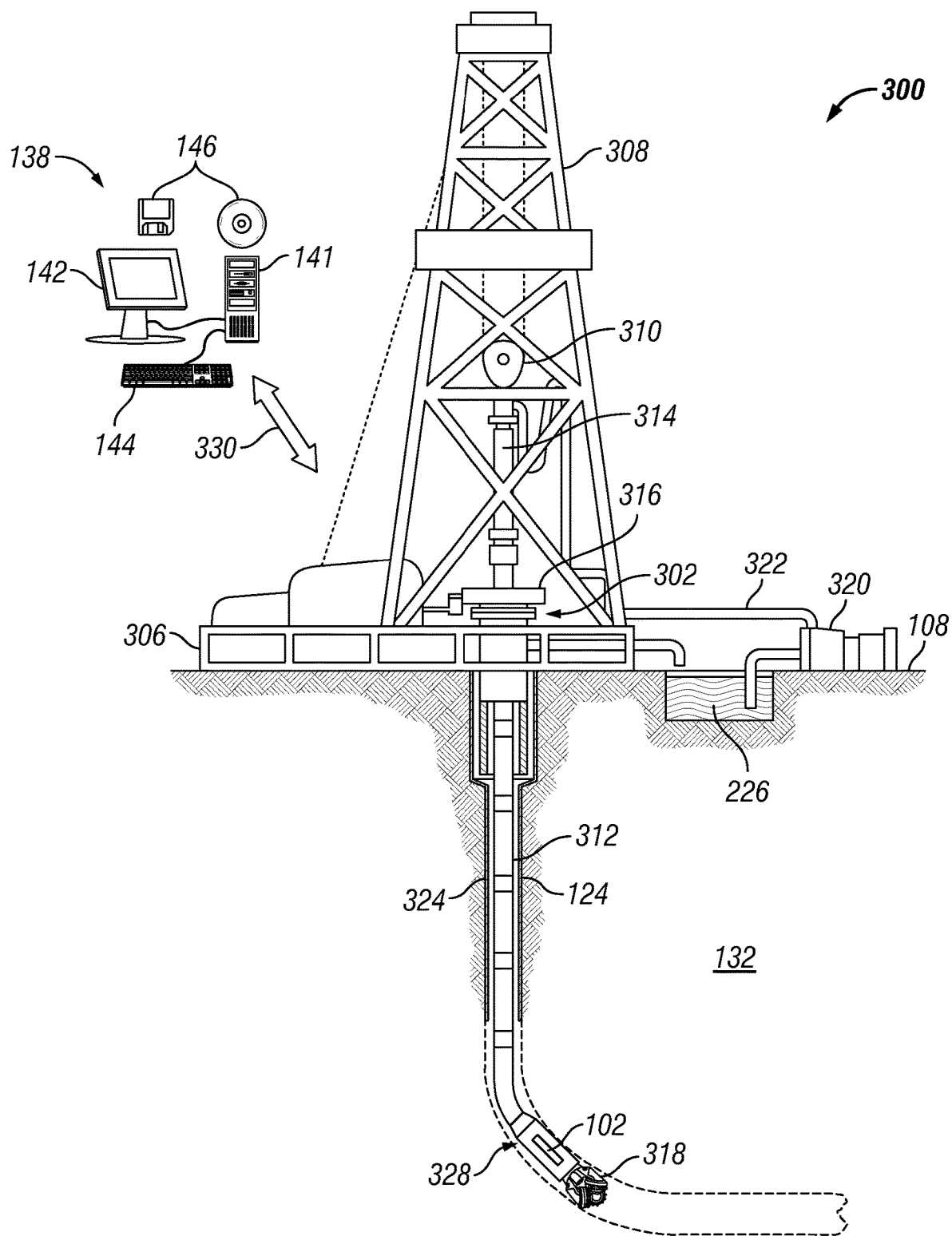
FIG. 3 illustrates another example of a well measurement system.

FIG. 3 illustrates an example in which downhole tool 102 may be disposed in a drilling system 200. As illustrated, borehole 124 may extend from a wellhead 302 into formation 132 from surface 108. As illustrated, a drilling platform 306 may support a derrick 308 having a traveling block 310 for raising and lowering drill string 312. Drill string 312 may include, but is not limited to, drill pipe and coiled tubing, as generally known to those skilled in the art. A kelly 314 may support drill string 312 as it may be lowered through a rotary table 316. A drill bit 318 may be attached to the distal end of drill string 312 and may be driven either by a downhole motor and/or via rotation of drill string 312 from surface 108. Without limitation, drill bit 318 may include, roller cone bits, PDC bits, natural diamond bits, any hole openers, reamers, coring bits, and the like. As drill bit 318 rotates, it may create and extend borehole 124 that penetrates various formations 132. A pump 320 may circulate drilling fluid through a feed pipe 322 to kelly 314, downhole through interior of drill string 312, through orifices in drill bit 318, back to surface 108 via annulus 324 surrounding drill string 312, and into a retention pit 326.

With continued reference to FIG. 3, drill string 312 may begin at wellhead 302 and may traverse borehole 124. Drill bit 318 may be attached to a distal end of drill string 312 and may be driven, for example, either by a downhole motor and/or via rotation of drill string 312 from surface 108. Drill bit 318 may be a part of bottom hole assembly 328 at distal end of drill string 312. Bottom hole assembly 328 may further include downhole tool 102. Downhole tool 102 may be disposed on the outside and/or within bottom hole assembly 328. Downhole tool 102 may include test cell 334.

As will be appreciated by those of ordinary skill in the art, bottom hole assembly 328 may be a measurement-while drilling (MWD) or logging-while-drilling (LWD) system.

Without limitation, bottom hole assembly 328 may be connected to and/or controlled by information handling system 114, which may be disposed on surface 108. Without limitation, information handling system 114 may be disposed down hole in bottom hole assembly 328. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 328 may be brought to surface 108. In examples, information handling system 114 may communicate with bottom hole assembly 328 through a fiber optic cable (not illustrated) disposed in (or on) drill string 312. In examples, wireless communication may be used to transmit information back and forth between information handling system 114 and bottom hole assembly 328. Information handling system 114 may transmit information to bottom hole assembly 328 and may receive as well as process information recorded by bottom hole assembly 328. In examples, a downhole information handling system (not illustrated) may include, without limitation, a microprocessor or other suitable circuitry, for estimating, receiving and processing signals from bottom hole assembly 328. Downhole information handling system (not illustrated) may further include additional components, such as memory, input/output devices, interfaces, and the like. In examples, while not illustrated, bottom hole assembly 328 may include one or more additional components, such as analog-to-digital converter, filter and amplifier, among others, that may be used to process the measurements of bottom hole assembly 328 before they may be transmitted to surface 108. Alternatively, raw measurements from bottom hole assembly 328 may be transmitted to surface 108.

Any suitable technique may be used for transmitting signals from bottom hole assembly 328 to surface 108, including, but not limited to, wired pipe telemetry, mud-pulse telemetry, acoustic telemetry, and electromagnetic telemetry. While not illustrated, bottom hole assembly 328 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 330, which may be a wired or wireless link. The telemetry data may be analyzed and processed by information handling system 114.

As illustrated, communication link 330 (which may be wired or wireless, for example) may be provided that may transmit data from bottom hole assembly 328 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Figure 4:
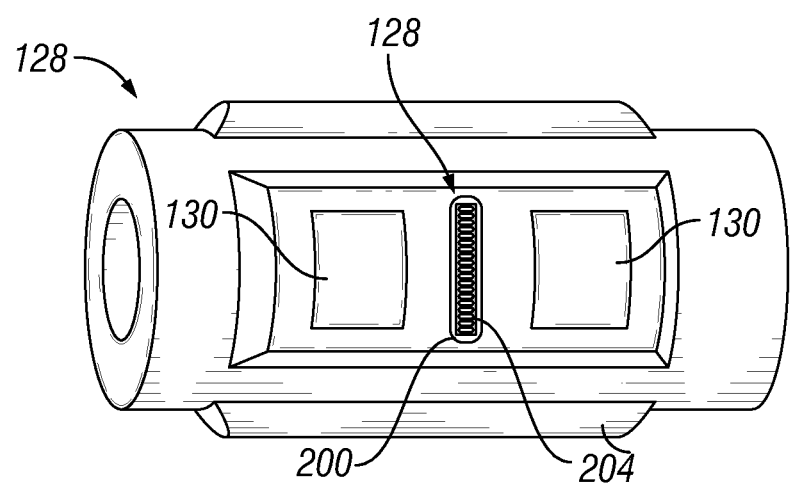
FIG. 4 illustrates another example of a pad.

FIG. 4 illustrates an example of pad 134. As illustrated, FIG. 4 is an example of a pad 134 that may be attached to downhole tool 102 on a bottom hole assembly 328 as illustrated in FIG. 3. In this example, pad 134 may be attached directly to downhole tool 102 and may not utilize one or more arms. Referring back to FIG. 4, pad 134 may serve to place button array 128 and/or return electrode 130 in contact with or in close proximity to borehole 124. Pad 134 may include a button array 128, a return electrode 130, a guard 200, and a housing 202. In examples, there may be a plurality of button arrays 128. Button array 128 may include an injector electrode 204, wherein injector electrode 204 may be a sensor that senses impedance of formation 132 (e.g., referring to FIG. 3). There may be any suitable number of button electrodes 204 within button array 128 that may produce a desired, predetermined current. Without limitation, the range for a suitable number of button electrodes 204 within button array 128 may be from about one injector electrode 204 to about one hundred button electrodes 204. For example, the range for a suitable number of button electrodes 204 within button array 128 may be from about one injector electrode 204 to about twenty-five button electrodes 204, from about twenty-five button electrodes 204 to about fifty button electrodes 204, from about fifty button electrodes 204 to about seventy-five button electrodes 204, or from about seventy-five button electrodes 204 to about one hundred button electrodes 204.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. In examples, a voltage difference between button array 128 and return electrodes 130 may be applied, which may cause currents to be emitted from button array 128 into the mud (not illustrated) and formation 132.

During operations, an operator may energize button array 128. A voltage may be applied between each injector electrode 204 and return electrode 130. The level of the voltage may be controlled by information handling system 114 (e.g., referring to FIG. 3). This may cause currents to be transmitted through button array 128. These currents may travel through the mud and formation 132 and may reach back to return electrode 130. The amount of current emitted by each injector electrode 204 may be inversely proportional to the impedance seen by that injector electrode 204. This impedance may be affected by the properties of formation 132 and the mud directly in front of each injector electrode 204. Therefore, current emitted by each injector electrode 204 may be measured and recorded in order to obtain an image of the resistivity of formation 132.

In examples, a current may be transmitted from injector electrode 204 and return to return electrode 130. These two electrodes may be referred to as the current electrodes. Then, the voltage drop across button array 128 may be measured and used to estimate the impedance of formation 132 (e.g., referring to FIG. 3). In these alternative implementations, button electrodes 204 may be referred to as voltage electrodes or monitor electrodes. Proposed method may operate in any of the two designs above or any other similar oil-based mud resistivity imager tool without any limitations. In the rest of the text, the imager tool will be assumed to be of the first design without any loss of generality.

Guard 200 may help to focus most of the current produced by button array 128 into formation 132 radially. Guard 200 may be disposed around button array 128. Guard 200 may include the same potential as button array 128.

In examples, housing 202 may serve to protect button array 128 and return electrodes 130 from the surrounding mud and formation 132 (e.g., referring to FIG. 3). Housing may be made with any suitable material. Without limitation, suitable material may include metals, nonmetals, plastics, ceramics, composites and/or combinations thereof. In examples, housing 202 may be a metal plate. Without limitation, housing 202 may be connected directly to downhole tool 102 on bottom hole assembly 328, as illustrated in FIG. 3. Furthermore, an insulating material may be used to fill the remaining portions of pad 134. In examples, ceramics may be used as the insulating material to fill the remaining portions of pad 134.

An impedance value may be calculated through the current transmitting between an injector electrode 204 and formation 132 for each injector electrode 204. The voltage between button array 128 and return electrodes 130 may be measured and divided by the transmitted current to produce a value for the impedance seen by each injector electrode 204. Most of the transmitted current may be returned to return electrodes 130 although some portions of it may return through housing 202 and downhole tool 102 (e.g., referring to FIG. 3).

Figure 5A:
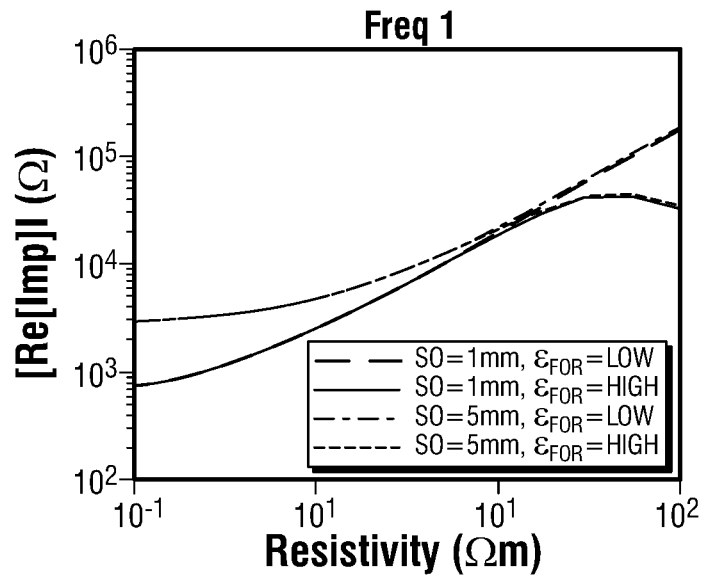
FIG. 5A is a graph of a real part of a response at lower frequency $f_1$.
Figure 5B:
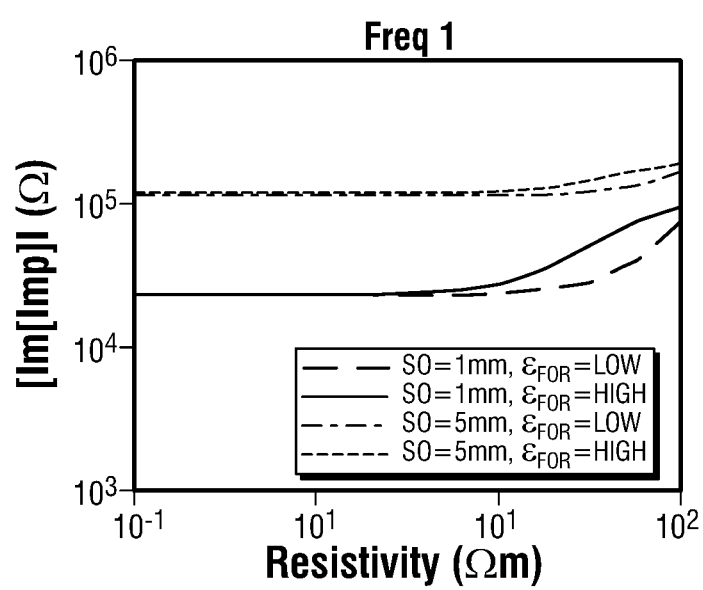
FIG. 5B is a graph of an imaginary part of a response at lower frequency $f_1$.
Figure 5C:
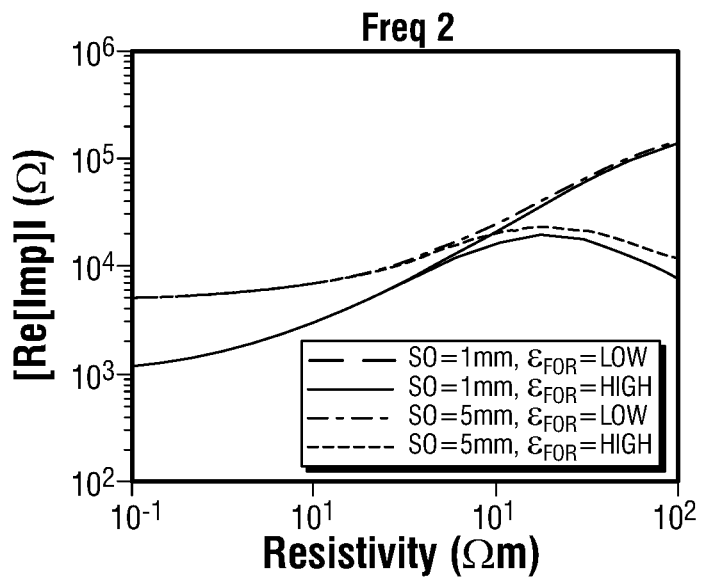
FIG. 5C is a graph of a real part of a response at higher frequency $f_2$.
Figure 5D:
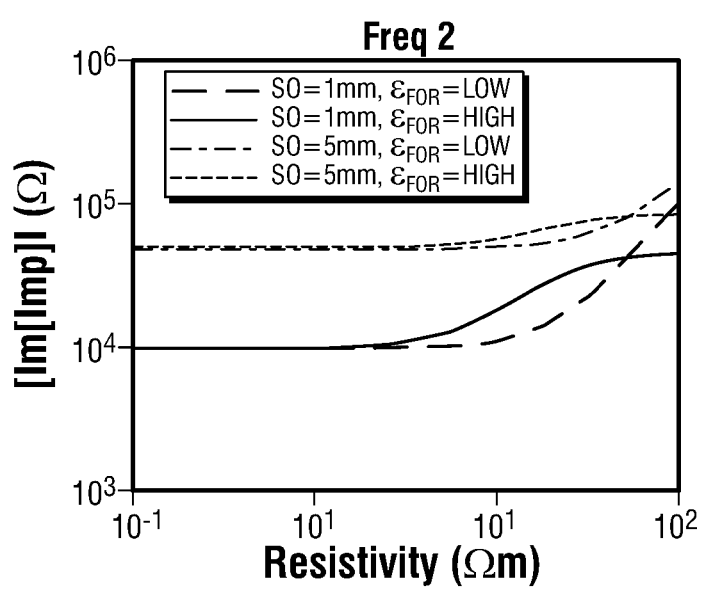
FIG. 5D is a graph of an imaginary part of a response at higher frequency $f_2$.

FIGS. 5A-5D illustrate example measurements that may be taken by pad 134 and the different responses with different standoff distances and formation properties in oil-based mud. FIG. 5A illustrates a real part of a measurement at lower frequency $f_1$. Without limitation, downhole tool 102 may operate in a frequency range between 1 mHz and 50 mHz In FIG. 5A, the lower frequency may be a frequency less than 10 mHz and a higher frequency may be frequency that is equal to or greater than 10 mHz FIG. 5B illustrates an imaginary part of the measurement at lower frequency $f_1$. FIG. 5C illustrates a real part of a measurement at higher frequency $f_2$. FIG. 5B illustrates an imaginary part of the measurement at higher frequency $f_2$.

In FIGS. 5A and 5B, the graphs illustrate that measured responses at low resistivities may be insensitive to formation permittivity, and these responses are primarily affected by each respective standoff. Thus, the measurement data at low formation resistivities may be used to determine the mud properties and standoff. In examples, without limitation, low resistivity is defined as not exceeding 10 Ω-m for operations in mHz frequency range (e.g., 1 mHz to 10 mHz) and may be as low as the logging environment allows (e.g., lower than 1 Ω-m). Additionally, if measurements at such low resistivities are not available, lowest resistivity regions in a given well may be used. Although this may decrease the accuracy of the obtained mud properties, since the contribution of the mud to the total signal may be low, inversion of formation parameters may not be greatly affected.

In examples, during measurement operations the radius of borehole 124 (e.g., referring to FIG. 1) may be different from the surface curvature of pad 134. Additionally, one or more injector electrodes 204 on button array 128 may have a gap between the surface of pad 134 and the wall of borehole 124, which may be filled with oil-based fluid. FIGS. 6A and 6B shows such standoff exists between the surface of pad 134 and the wall of borehole 124 due to the mismatch of pad surface curvature and borehole radius. In examples, injector electrodes 204 that have the largest standoffs may be determined based on the borehole radius profile and therefore selected for determining mud properties. Additionally, measurement data may be selected from the section with fracture or holes or washouts as well, especially in the scenario of no mismatch between borehole radius and pad curvature.

Before measurement data may be used to determine oil-based mud properties, pad 134, injector electrode 204, and/or button array 128 (e.g., referring to FIG. 2) may be calibrated before logging operations. Without limitation, calibration operations may be performed by making measurements in a homogeneous medium in a test tank (not illustrated) or attaching a calibrator device with circuit elements that have known impedances between each injector electrodes 204 and the return. In a second calibration method, a calibrator device (not illustrated) may be built to be conformal to pad 134 with insulating material surrounding the circuit elements and substantially covering the front face of pad 134 (wherein the contact faces of injector electrodes 204 and return electrodes 130 (e.g., referring to FIG. 1) are located, which may minimize leakage effects. Calibration is used to remove the inherent gain and phase offsets between injector electrodes 204. Therefore, all injector electrodes 204 may measure the same value in a homogeneous medium. In reality, calibration is not perfect and some variations in the responses of injector electrodes 204 may occur. Nonetheless, it may be assumed that the variations of injector electrodes 204 in front of a homogeneous formation is substantially due to the standoff variations between injector electrodes 204. As discussed above, this standoff variation may be used to determine a set of injector electrodes 204 suited for the determination of the mud properties.

In examples, pad 134 may not be perfectly actuated to have pad 134 centered on the wall of borehole 124 (e.g., referring to FIG. 1). In further examples, the borehole shape is not perfectly circular, such boreholes 124 may instead have elliptical shapes. In these examples, actual tool responses may not fit expected responses. It is desirable in such cases to pick out the most suitable injector electrodes 204 through an analysis of the data.

FIG. 7 illustrates an example workflow 700 for identifying injector electrodes 204 (e.g., referring to FIG. 6A) which may fit expected responses. In block 702, workflow 700 may begin with applying edge detection on measurements to divide well into zones. In examples, edge detection may be performed by a Canny edge detector, may be applied to the measured impedance to find different formation zones Dividing the well into zones may be performed by finding an average response of injector electrodes 204 (e.g., referring to FIG. 2) over a depth interval. This depth interval should be large enough to filter out the variations due to the rugosity of borehole 124 or formation features while not so large that properties of borehole 124 and pad 134 change. In examples, downhole tool 102 may have resolutions that may be in the order of 0.1 inches (0.25 cm), a suitable depth interval may be 1 ft (0.305 meter) or larger. This interval would ideally correspond to a low resistivity formation to minimize the contribution of the formation signal to the measurements (i.e., maximize mud signal.) The section with low formation resistivity may be predicted from other logs formed from other tools, estimation from $Z\alpha$ processing, and/or other like methods. As described above, zones with formation resistivity <1 $\Omega$m may be selected for minimum influence of formation dielectric constant. In block 704 an average absolute impedance over each zone may be calculated. In examples, an absolute value of the measured impedance may be used to determine regions with low resistivity. Without limitation, low resistivity is defined as the region of resistivity that is insensitive to formation permittivity. In our context, the region is less than 2 Ohm·m (approximately) as shown in FIGS. 5A-5D. In low resistivity regions, absolute value of the measured impedance may be low. Real and imaginary part of the data may also be used in other examples for this purpose but the greatest accuracy is expected from the absolute value of the impedance since it has relatively higher sensitivity than the imaginary part and the real part exhibits a rolloff behavior that complicates its interpretation at high resistivity formations. Without limitation, rolloff behavior is defined as the region to the right of the peaks (with higher resistivity) shown in FIGS. 5A and 5C. The rolloff behavior in real part cause multiple solutions in determining the resistivity. In block 706 identified zones may be sorted by average absolute impedance. In block 708 the zone or zones that have the lowest absolute impedance are selected for determining mud properties. Zone with the lowest average resistivity may always be selected in case none of the zones are below the threshold. Without limitation, in examples, a specific number of low resistivity zones may be selected, such as three zones with the lowest average absolute impedance.

If there are multiple low resistivity zones, an indicator of the variation of the signal over the selected zone (such as the standard deviation; which may further be divided by the mean value over the selected interval for normalization purposes) may be calculated over each zone. In examples, this signal may be the measured impedance of all injector electrodes 204 in all pads 134 (e.g., referring to FIGS. 6A and 6B). Then, among such zones, the zone with the lowest variation may be used for determining mud properties to decrease noise. In examples, mud properties may be found for each zone and an interpolation technique may be used to find the mud properties in between zones where mud properties were found. Furthermore, if there is a large amount of such zones, a smoothing filter may be applied to the results to reduce the noise.

However, in examples, a set of injector electrodes 204 (e.g., button array 128) with an average response that has the highest absolute impedance values may be used for mud evaluation over the determined zone. In this example, injector electrodes 204 with relatively high impedance (i.e. high mud contribution) in regions with low formation resistivity may be utilized. This is due to the fact that the presence of additional standoff, assuming formation properties do not change, may be quantified as an increase in the total impedance. Additionally, in examples, other measures of impedance such as its real part and its imaginary part may be used.

To account for the calibration irregularities in determining injector electrodes 204 with the highest standoff, a polynomial curve fitting method may be employed. It is expected that the variation of the response over injector electrodes 204 of pad 134 (e.g., referring to FIG. 2) follow a smooth curve that is consistent with the mismatch of pad 134 and the borehole shape. This variation in response may be characterized with a $2^{nd}$ order polynomial. In examples, a higher order polynomial may be used. However, order of the polynomial should not be so high to fit the noise rather than the underlying true geometric factor of downhole tool 102 (e.g., referring to FIG. 1). Thus, order of the polynomial should not exceed a fourth order. This polynomial fit may be obtained by a least squares estimation. In examples, large outliers may be thrown out during the polynomial fitting process. This may be accomplished by trying to find the polynomial fit that produce the least amount of mismatch for a subset of injector electrodes 204 over a pad 134 (such as 75%). Then, iterating over possible combinations of such subset of injector electrodes 204, a polynomial fit that produces the global minimum mismatch among the possible combinations may be selected.

Figure 8:
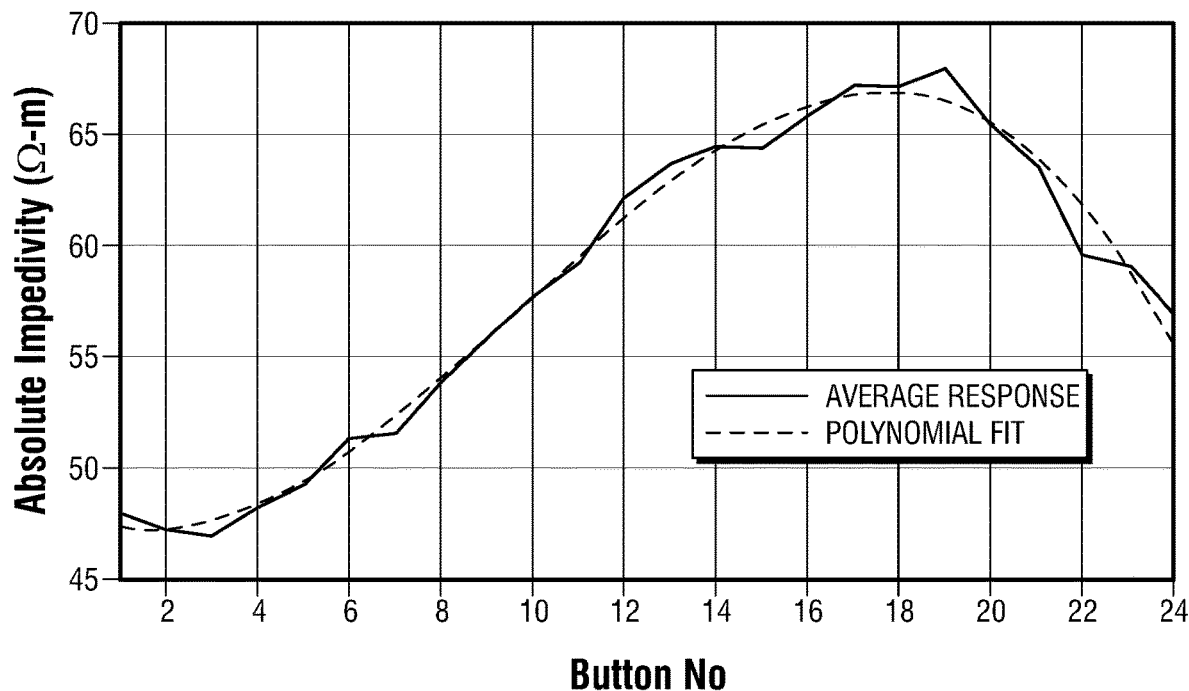
FIG. 8 illustrates a graph of a measured response at different injector electrodes.

FIG. 8 is a graph illustrating an example of injector electrodes 204 (e.g., referring to FIG. 2) selection process described above. An average absolute impedivity response for a pad 134 with twenty-four injector electrodes 204 is plotted in solid lines. Ideally, response is expected to be symmetric around the middle of pad 134 (12th and 13th buttons.) However, due to previously discussed effects such as borehole shape and actuation inaccuracies, the measured response is skewed. Maximum impedivity (impedance divided by a tool constant) response is obtained at the nineteenth injector electrodes 204. A polynomial fit using a 3rd order polynomial is also shown in FIG. 8 using dashed lines. Polynomial fit shows the maximum response to be at the eighteenth injector electrodes 204. As an example, from the response shown in FIG. 8, a combination of injector electrodes 204 with responses that are more sensitive to mud, such as the fifteenth through twentieth injector electrodes 204, may be selected for determining the mud properties. Although polynomial fit and average response are very similar for this particular example, in other cases, a very noisy injector electrodes 204 that deviates significantly from the polynomial fit may be thrown out regardless of its absolute impedance levels in mud evaluation. It may also be deduced that using the polynomial fit approach prevent a less sensitive injector electrodes 204 to be selected due to measurement noise. In other cases, noisy injector electrodes 204 may be determined using other methods. In one such method, a measure of the variation of the response of each injector electrodes 204 (such as standard deviation normalized by mean) may be compared with other injector electrodes 204. If a specific injector electrode 204 is deemed noisy (for example, 20% or more variation compared to the average of the variations of all injector electrodes 204), this injector electrodes 204 may not be used during the polynomial fitting process and may be excluded from the determination of mud properties as before.

Figure 9:
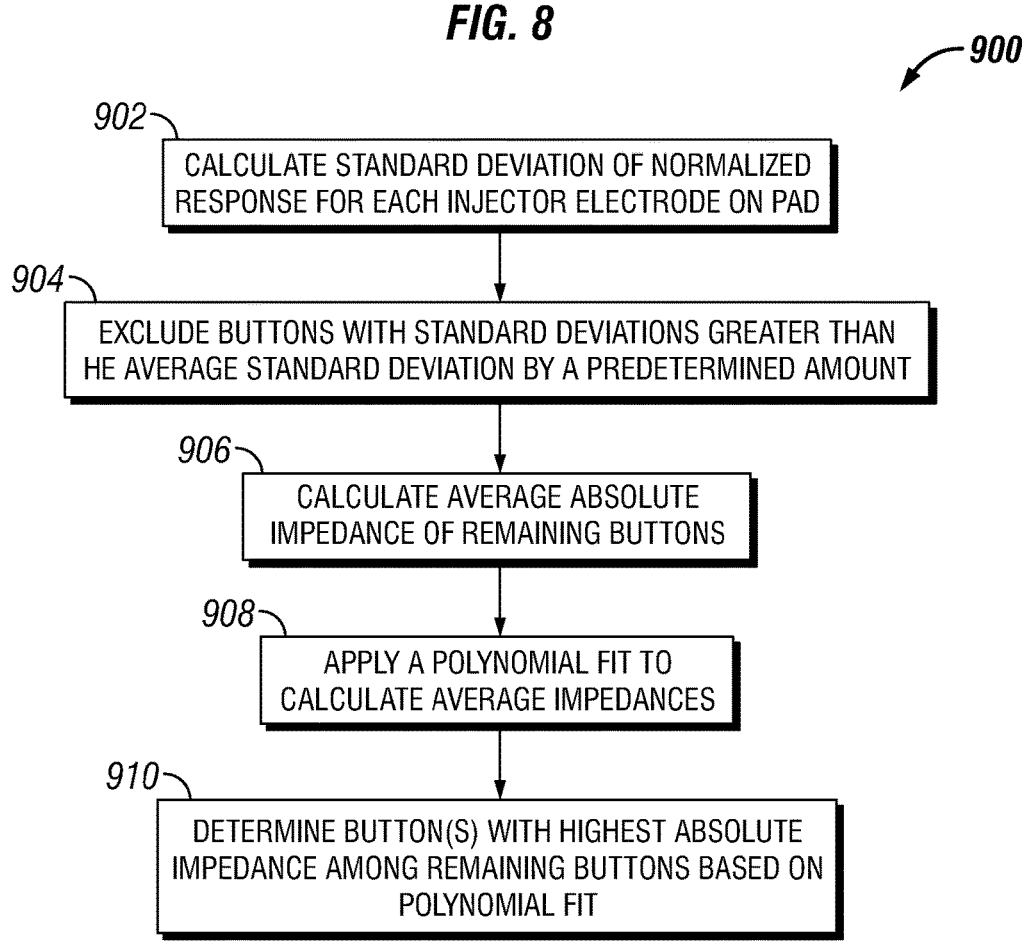
FIG. 9 is an example workflow for using injector electrodes for estimating mud properties.

FIG. 9 illustrates an example workflow 900 for selecting injector electrodes 204 to be used for estimating mud properties. As illustrated, workflow 900 begins with block 902. In block 902 the first step may be to calculate a standard deviation of a normalized response for each injector electrode on pad 134 (e.g., referring to FIG. 2). In block 904, injector electrodes with standard deviations greater than the average standard deviation (found in block 902) by a predetermined amount are excluded. In general electrodes with standard deviations 50% or greater than the average (or median) standard deviation may be excluded; however, this threshold is tool and application dependent and may be a lot more restrictive than 50% based on tool characteristics. In block 906 the average absolute impedance is calculated from the remaining injector electrodes. In block 908 a polynomial fit is applied to calculated average absolute impedances. Finally, in block 910, injector electrodes with the highest absolute impedance are found among remaining injector electrodes based on the polynomial fit.

In examples, mud properties may be found in regions where there is a large mud effect. As mentioned above, cavings or washouts on the borehole wall which is filled with resistive mud may be suitable for this purpose. Such cavings may be automatically detected from the data by finding contiguous injector electrodes 204 (e.g., referring to FIG. 2) with large absolute impedances over a depth interval. An image interval continuous in depth and azimuth (i.e. across injector electrodes 204) with a large absolute impedance may indicate a caving. Additionally, blob detection techniques, such as the Laplacian of the Gaussian method, may be used to determine the presence of the cavings.

Figure 10:
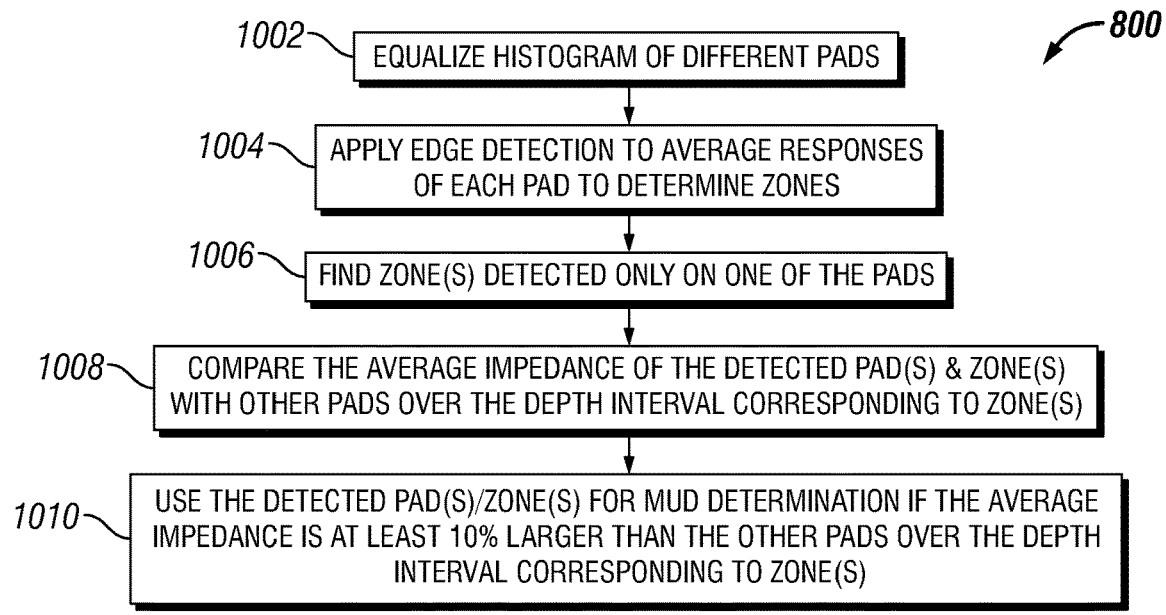
FIG. 10 is an example workflow for determining regions where a pad may not be in contact with the wall of a borehole.

In order to determine if measurements are accurate, it should be determined if any pad 134 in which measurements originate are in contact with the wall of borehole 124 (e.g., referring to FIG. 1). FIG. 10 illustrates an example workflow 1000 which may be used to determine a pad 134 is not in contact with the wall of borehole 124. Difference between pads 134 may be used to determine pads 134 that may have lost substantial contact with the wall of borehole 124 during logging. This may be due to the rugosity of the borehole (such as the caving issue described above.) There may be a protruding edge on the borehole wall that may prevent a substantial portion of pad 134 to engage with the wall of borehole 124 (in particular, the portion of pad 134 with the sensors) and thus create a large standoff of one or more inches (2.5 cm). Although such an event is detrimental for the image itself, it may be useful in determining mud properties. Workflow 1000 beings with block 1002. In block 1002, an equalizing histogram of different pads 134 is created. In examples, responses of different pads 134 may first be normalized over the whole well to account for differences related to inaccurate calibration. This normalization may be performed by a histogram equalization. Then, intervals where one or more pads 134 may have lost contact with the wall of borehole 124 may be found by finding a large increase in response of a pad 134 compared to other pads 134 over a depth interval. To accomplish this, an average response of each pad 134 (across injector electrodes 204) may be found for each pad 134. In block 1004 an edge detection is applied to average response of each pad 134 to determine zones. An edge detection algorithm, such as the Canny edge detector, may be used to find the regions where each pad 134 shows a significant change in measured response. In block 1006, zones are detected only on one of the pads 134. For example, zones where one of the pads 134 show a large increase in measured impedance while the other pads' 134 response do not change significantly within the same depth interval may be found. In block 1008, the average impedance of the detected pads & zones are compared with other pads 134 over the depth interval correspond to zones. In such a zone, average absolute value of one pad 134 may be 10% or a greater amount higher than the average of other pads 134. In block 1010, detected pads/zones are used for mud determination if the average impedance is at least 10% larger than other pads 134 over the depth interval corresponding to zones. Without limitation, determination of mud properties may be performed using all injector electrodes 204 or a subset of injector electrodes 204 on pad 134 with the large increase in measured impedance.

Other methods outside of workflow 1000 may be utilized. For example, an interval used for injector electrodes 204 selection may be larger than the interval used for determining mud properties. If the deviation of the tool response is deemed to be not varying significantly with depth, and the rotation of downhole tool 102 is negligible, an average of the measurements over an interval much larger than that was used to determine the mud properties may be used to calculate an injector electrode 204 or injector electrodes 204 that may provide the best mud response. Such an approach will reduce the effect of noise in injector electrodes 204 determination. Rotation information of downhole tool 102 may be obtained via methods common in practice that provide navigational information, for example through the use of magnetometers and gyroscopes. Without limitation, it may be desirable that the amount of rotation of downhole tool 102 may not exceed 3° over the selected depth interval.

Again, without limitation, standard deviation of the tool response over such an interval may be 20% or less of the average (or median) tool response in that interval.

Without limitation, both the resistivity and relative permittivity of oil-based mud may be approximated using a log-linear model. Therefore, only four parameters may be needed to represent the frequency dependent mud property over operating frequencies of downhole logging tool 102 (e.g., referring to FIG. 1). By using the aforementioned information, an inversion-based method may be developed to determine the oil-based mud properties using multi-frequency measurement data from downhole tool 102.

Figure 11:
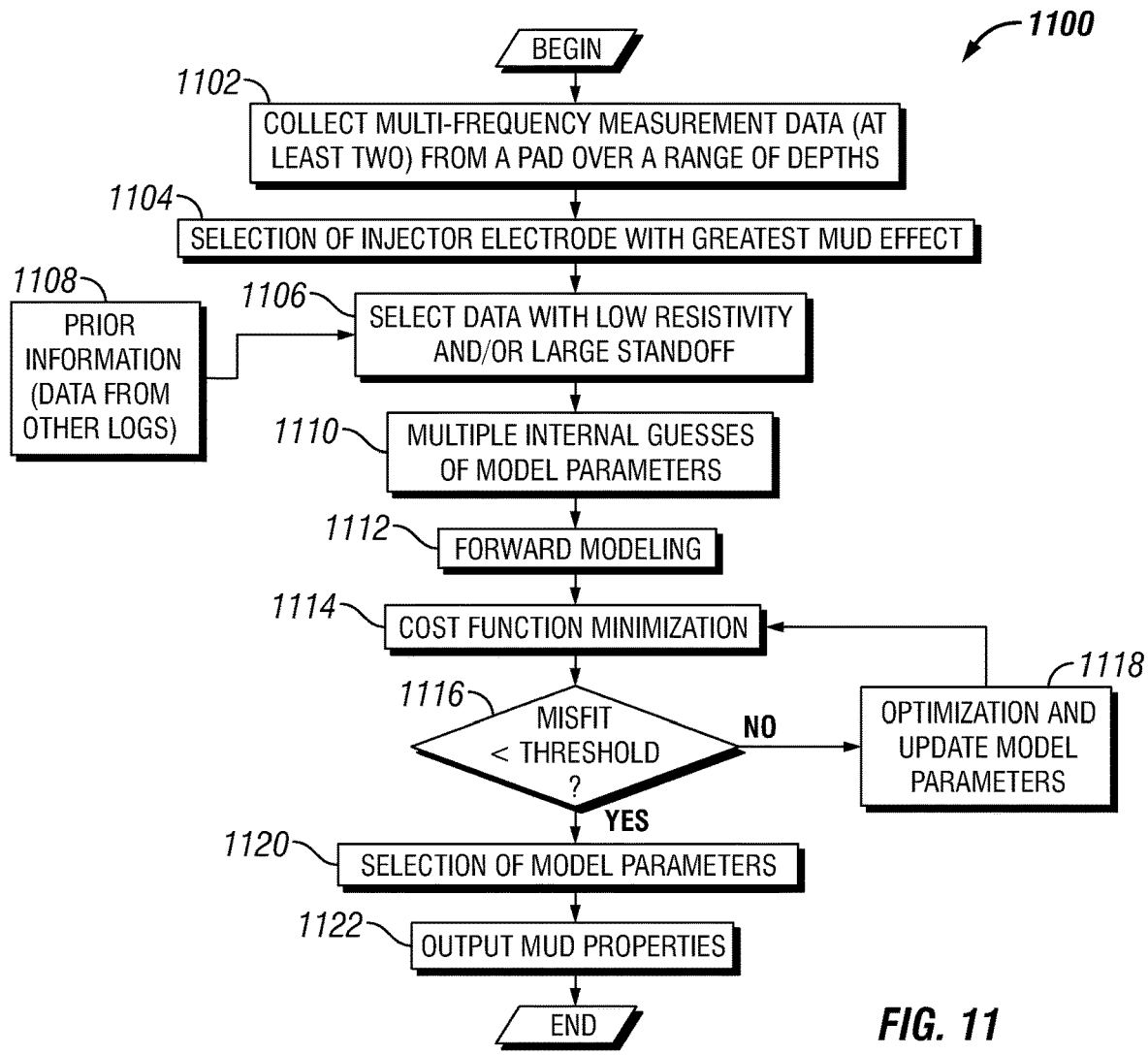
FIG. 11 is an example workflow for estimating mud properties.

FIG. 11 illustrates an example workflow 1100 for estimating mud properties by measurement from pad 134 of downhole tool 102 (e.g., referring to FIG. 1). Workflow 1100 assumes downhole tool 102 is already calibrated. Workflow 1100 begins with block 1102. In block 1102, multi-frequency measurement data is selected from a pad 134 over a range of depths. In examples, the measurement data includes data from at least two frequencies. In block 1104, injector electrodes 204 with the greatest mud effect are selected. In examples, workflow 1000 (e.g., referring to FIG. 10) may be utilized to find injector electrodes 204 with the greatest mud effect. It should be noted that, all injector electrodes 204 may be selected and constraints on the standoff of each injector electrodes 204 may be added. In block 1106, a depth section is selected with low resistivity and/or a large standoff. A low resistivity formation may be chosen using workflow 900 (e.g., referring to FIG. 9). Additionally, in block 1108, prior information (data from other logs) may be used to help in the selection process of block 1106. From block 1106, mud properties may be determined. Mud properties may be determined beginning with block 1110. In block 1110, multiple initial guesses of model parameters are used. In examples, the model may include mud parameters, stand-offs, and optional formation, and sensors parameters. Multiple initial guesses are constructed based on prior information, other logs and/or measurements. In block 1112, a forward modeling is performed by computing the response from the model in block 1110. In block 1114, a cost minimization is performed. Results from the cost minimization are reviewed in block 1116. In block 1116, it is determined if the misfit is less than a threshold value. Without limitation, the threshold is defined as a user adjustable value and that may have a small value. In examples, a small value 0.01 should give reasonable accuracy. If the misfit value is not less than the threshold, then in block 1118, the model parameters are optimized and updated. The new model parameters are put into block 1112 for more forward modeling. Block 1114 and 1116 are repeated until the misfit is less than the threshold. Once the misfit is found to be less than the threshold, in block 1120 the model parameters are selected and used in block 1122 to find an output of mud properties.

Referencing block 1110, the model may incorporate information such as relative distance/offset among injector electrodes 204 (e.g., referring to FIG. 2). In examples where borehole 124 (e.g., referring to FIG. 1) is smooth and pad 134 (e.g., referring to FIG. 2) is well centered, $\Delta d_{ij}$ may be determined from the pad geometry and therefore the degrees of freedom of the standoffs between injector electrodes 204 and wall of borehole 124 along the azimuthal direction may be constrained. For example, in the scenario of borehole radius>pad radius (e.g., referring to FIG. 6A), the twelfth injector electrodes 204 is closest to the wall of borehole 124 and the standoff between j-th button and wall of borehole 124 may be expressed as $$SO_j = SO_{12} + \Delta d_{12j} \qquad (1)$$

Accuracy of this assumption may be tested based on the resulting model misfit in block 1214. If the misfit is large, standoffs of each injector electrodes 204 (e.g., referring to FIG. 2) may be solved independently, but such an approach increase the number of unknowns in inversion. In examples, for a noncircular borehole, if the borehole shape is known (from caliper measurements etc.), the relative actuation (rotation) and azimuthal location of pad 134 within borehole 124 (e.g., referring to FIG. 1) may be determined approximately using the average pad response such as the one shown in FIG. 9. This may be done based on a geometrical model of borehole 124 and pad 134 where pad 134 is moved and rotated within borehole 124 to minimize the standoff profile with a scaled version of the inverse of the average impedance profile shown in FIG. 8. Thus, $\Delta d_{ij}$ may again be found with respect to a reference injector electrode 204 and incorporated into a forward model of block 1110, referring back to FIG. 11.

Referring to block 1112, forward modeling may be based on any combination of analytical and/or semi-analytical and/or finite-difference and/or finite-volume and/or finite-element and/or boundary-element and/or integral equation methods implemented in Cartesian and/or cylindrical and/or polar coordinates. The forward modeling method may be programmed on serial and/or parallel (including GPU) processing architectures. Additionally, forward modeling in block 1112 may be substituted with interpolation in a pre-built library using data obtained from laboratory measurement or simulated responses from the abovementioned analytical and/or semi-analytical and/or numerical methods.

Referring to block 1116, several measurements from a nearby depth at particular section/zone may be used in the cost function to produce effective mud property of that section/zone. Additionally, in block 1118, the selection criteria of the model parameters may be based on the convergence of inversion, physics of mud properties and/or continuity with previous solutions etc. Those non-physical solutions may be eliminated or filtered in this process. Downhole depth profile of a property of the oil-based mud may be constructed using the mud property determined at a different depth using aforementioned workflow. The inversion-based mud properties at different depths may also be used to optimize or used as a correction for other analytical based mud property profiles.

Figure 12A:
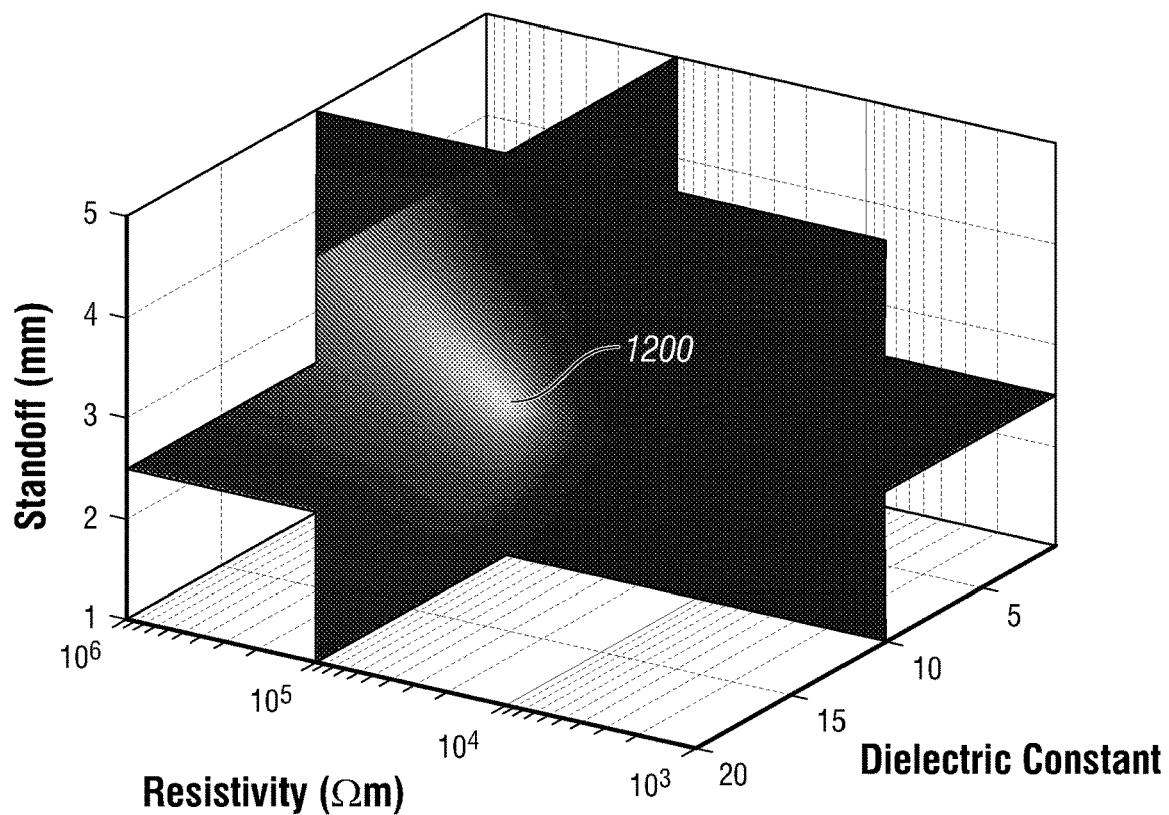
FIG. 12A is a 3D plot for an inversion's cost function for mud properties.
Figure 12B:
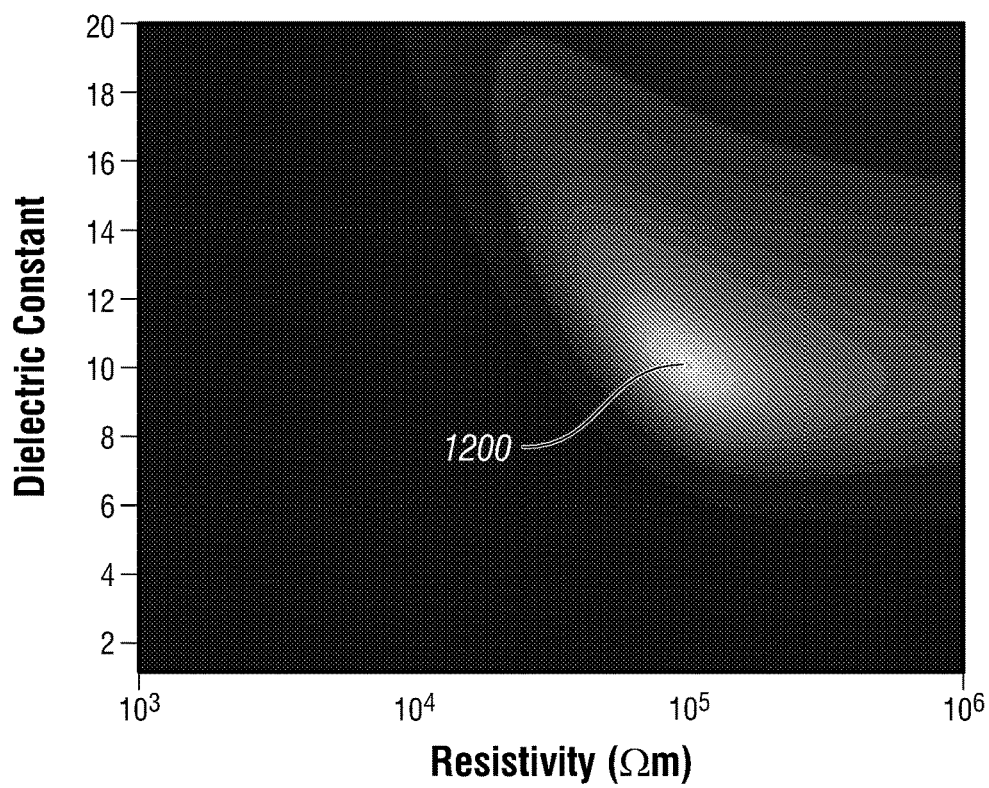
FIG. 12B is a 2D plot for an inversion's cost function for mud properties.

FIGS. 12A and 12B show a 3D plot and a 2D plot, respectively, of the cost function performed in block 1114 in workflow 1100 (e.g., referring to FIG. 11). In this example, area 1100 in the plots is the minimum point of cost function with mud resistivity of 100000 Ωm, dielectric constant of 10 and standoff of 2.5 mm. Convergence to the global minimum point may be achieved using the initial guesses described in block 1110 of workflow 1100.

Figure 13A:
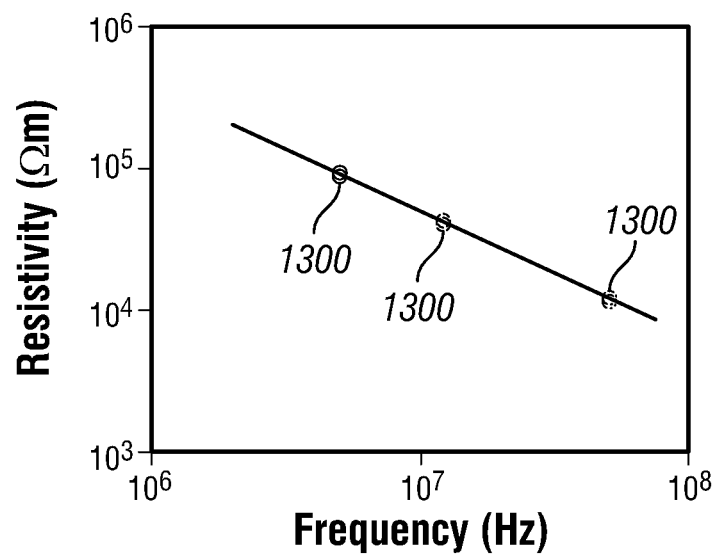
FIGS. 13A and 13B illustrates inverted mud profile using synthetic data generated using perturbed mud properties with gradual gradient.
Figure 13B:
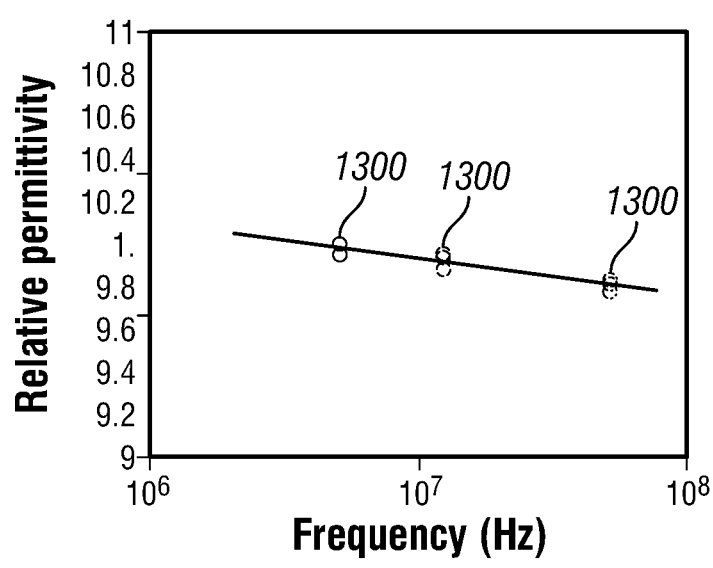

FIGS. 13A and 13B are graphs illustrating an example of an inverted mud property over an operating frequency range of downhole tool 102 (e.g., referring to FIG. 1). The synthetic input was multi-frequency data generated from log-linear mud profile with gradual gradient. At each frequency, three samples 1300 were generated and perturbed with random generated noise. All the multi-frequency samples data are used simultaneous in the inversion and the selection of model parameters is on the basis of minimum misfit. It is observed that the inverted mud property fit both mud resistivity and relative permittivity well.

Figure 14A:
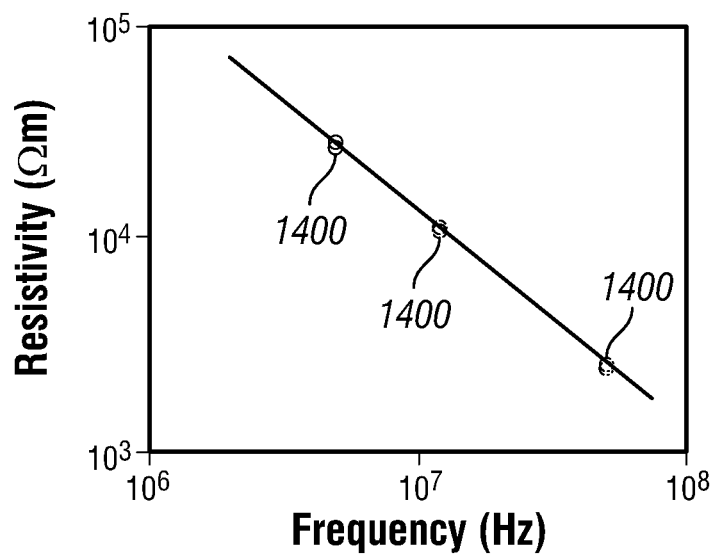
FIGS. 14A and 14B illustrates inverted mud profile using synthetic data generated using the perturbed mud properties with steeper gradient.
Figure 14B:
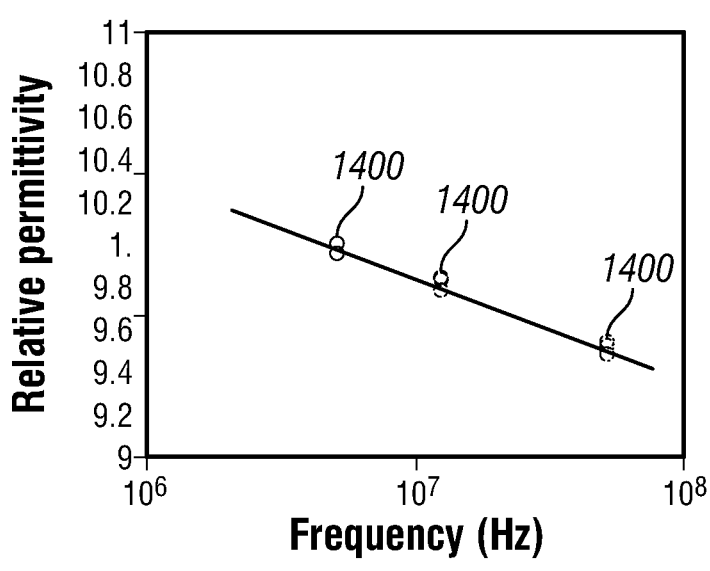

FIGS. 14A and 14B are graphs illustrating another example of the inverted mud property. Samples 1400 generated at each frequency are obtained from a mud profile with steeper gradient and perturbed with random generated noise. It is observed the inverted mud property fit both mud resistivity and relative permittivity well.

Figure 15:
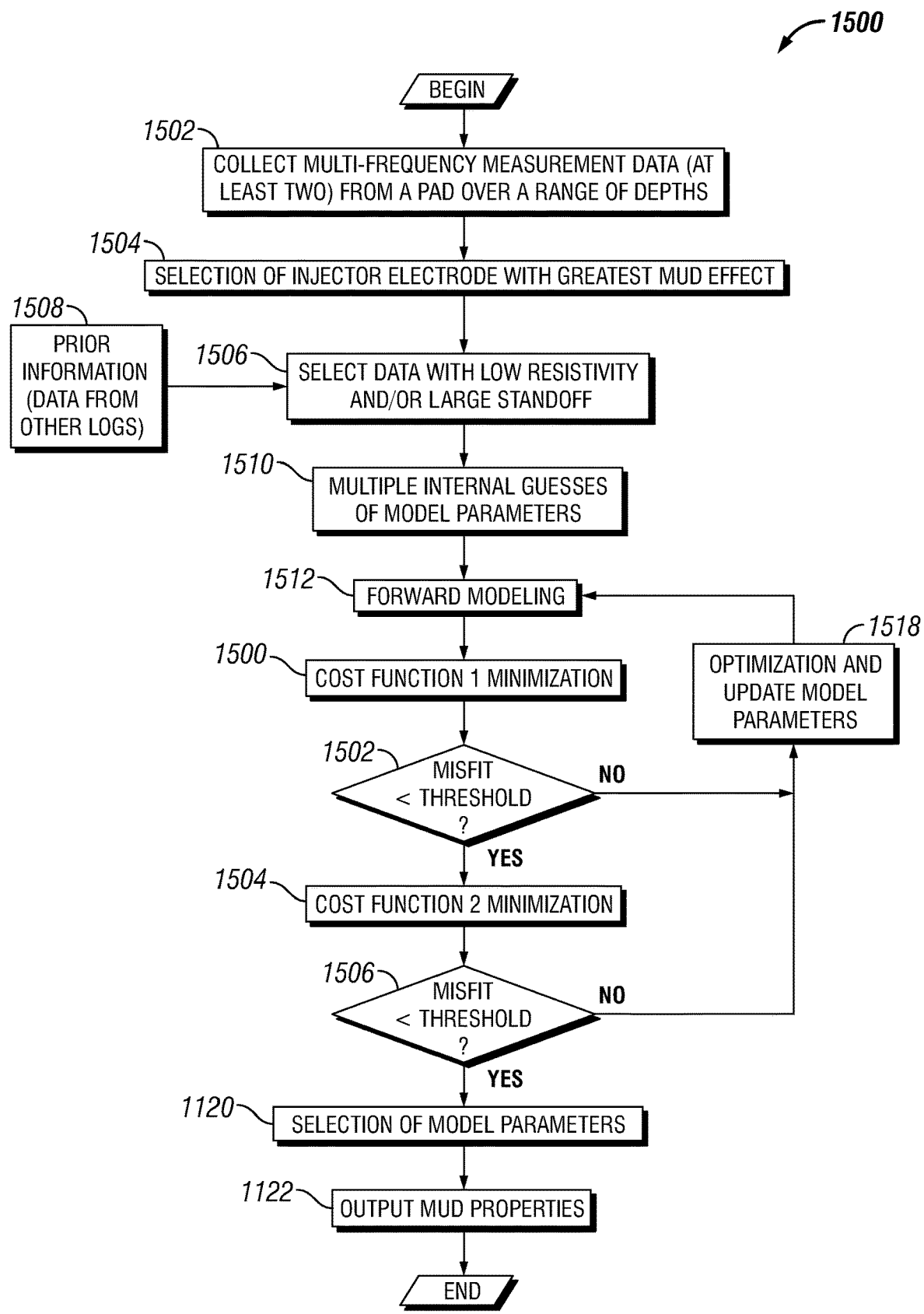
FIG. 15 is another example of a workflow for estimating mud properties.

FIG. 15 illustrates an alternative example workflow 1500 for estimating the mud property from downhole tool 102 measurements. As illustrated in FIG. 15, blocks 1102 through 1122 are the same as described in workflow 1100 of FIG. 11, except for blocks 1114 and 1116. In workflow 1500 blocks 1114 and 1116 are replaced with blocks 1502 through 1508 have been added. In the previous workflow 1100 (e.g., referring to FIG. 11), the procedure of determining mud property was found utilizing a single minimizing cost function. In workflow 1500, block 1502 a cost minimization is performed. In this block, the cost minimization is performed with respect to the formation properties. Results from the cost minimization are reviewed in block 1504. In block 1504, it is determined if the misfit is less than a threshold value. Without limitation, the threshold is defined as a user adjustable value and that may have a small value. In examples, a small value 0.01 should give reasonable accuracy. If the misfit value is not less than the threshold, then in block 1118, the model parameters are optimized and updated, as discussed above. The new model parameters are put into block 1112 for more forward modeling. Blocks 1502 and 1504 are repeated until the misfit is less than the threshold. Once the misfit is found to be less than the threshold, the values are transferred to block 1506. In block 1506 a second cost minimization is performed, the second minimization is with respect to mud properties. Results from the second cost minimization are reviewed in block 1508. In block 1508, it is determined if the misfit is less than a threshold value. Without limitation, the threshold is defined as a user adjustable value and that may have a small value. In examples, a small value 0.01 should give reasonable accuracy. If the misfit value is not less than the threshold, then in block 1118, the model parameters are optimized and updated, as discussed above. The new model parameters are put into block 1112 for more forward modeling. Blocks 1502 through 1508 are repeated until the misfit is less than the threshold. Once the misfit is found to be less than the threshold. Once the misfit is found to be less than both thresholds in blocks 1104 and 1108, in block 1120 the model parameters are selected and used in block 1122 to find an output of mud properties.

Statement 1. A method for determining mud properties may comprise taking multi-frequency measurement data with a downhole tool. The downhole tool may comprise a mandrel, one or more arms attached to the mandrel, one or more pads attached to the one or more arms, and one or more injector electrodes disposed on the one or more pads. The method may further comprise selecting an injector electrode from the one or more injector electrodes for the multi-frequency measurement data, selecting data from the multi-frequency measurement data with low resistivity or a large standoff, creating a forward model based at least partially on the selected data by making initial guesses of model parameters for one or more mud properties, performing a cost function minimization with the forward model, identifying from the cost function minimization if a misfit is above or below a threshold, and identifying the one or more mud properties based at least in part on the cost function minimization.

Statement 2. The method of statement 1, where the identifying mud properties are found using an inversion.

Statement 3. The method of statement 2, further comprising identifying formation properties with the one or more mud properties during the inversion.

Statement 4. The method of statements 1 or 2, wherein the selecting an injector electrode from the one or more injector electrodes may comprise calculating a standard deviation of a normalized response for each of the one or more injector electrodes, excluding an injector electrode from the one or more injector electrodes with the standard deviation higher than an average standard deviation of the one or more injector electrodes, calculating an average absolute impedance of the one or more injector electrodes remaining by applying a polynomial fit to calculate the average absolute impedance, and determining which of the one or more injector electrodes have a highest absolute impedance.

Statement 5. The method of statement 4, further comprising determining the highest absolute impedance based at least in part on the polynomial fit.

Statement 6. The method of statements 1, 2, or 4, wherein the selecting an injector electrode from the one or more injector electrodes may further comprise applying an edge detection on the multi-frequency measurement data, dividing the multi-frequency measurement data into one or more zones, calculating an average absolute impedance over the one or more zones, and selecting the one or more zones that have a lowest absolute impedance.

Statement 7. The method of statements 1, 2, 4, or 6, further comprising identifying if the one or more pads are in contact with a borehole wall.

Statement 8. The method of statement 7, wherein the identifying if the one or more pads are in contact with the borehole wall may comprise creating an equalize histogram for each of the one or more pads, applying an edge detection to an average response for each of the one or more pads, identifying one or more zones from the edge detection, comparing an average impedance of the one or more zones with each zone, and identifying a zone that has an impedance that is 10% or larger than the average impedance.

Statement 9. The method of statement 8, wherein the zone identifies a caving or a washout.

Statement 10. The method of statement 9, further comprising using a blob detection algorithm to detect the caving or the washout.

Statement 11. A system may comprise a downhole tool, which may comprise a mandrel, wherein the mandrel is a structural support for the downhole tool, one or more arms, wherein the one or more arms are attached to the mandrel, one or more pads, wherein the one or more pads are connected to the one or more arms, and one or more injector electrodes, wherein the one or more injector electrodes are disposed on each of the one or more pads and are configured to take a measurement. They system may also comprise an information handling system configured to select an injector electrode from the one or more injector electrodes for multi-frequency measurement data, select data with low resistivity or a large standoff, create a forward model by making initial guesses of model parameters for one or more mud properties, perform a cost function minimization with the forward model, identify from the cost function minimization if a misfit is above or below a threshold, and identify the one or more mud properties based at least in part on the cost function minimization.

Statement 12. The system of statement 11, where the one or more mud properties are found using an inversion.

Statement 13. The system of statement 12, wherein the information handling system is further configured to identify formation properties with the one or more mud properties during the inversion.

Statement 14. The system of statements 11 or 12, wherein the information handling system may be further configured to calculate a standard deviation of a normalized response for each of the one or more injector electrodes, exclude an injector electrode from the one or more injector electrodes with the standard deviation higher than an average standard deviation of the one or more injector electrodes, calculate an average absolute impedance of the one or more injector electrodes remaining by applying a polynomial fit to calculate the average absolute impedance, apply a polynomial fit to calculate the average absolute impedance, and determine which of the one or more injector electrodes have a highest absolute impedance.

Statement 15. The system of statement 14, wherein the information handling system is further configured to determine the highest absolute impedance based at least in part on the polynomial fit.

Statement 16. The system of statements 11, 12, or 14, wherein the information handling system may be further configured to apply an edge detection on the multi-frequency measurement data, divide the multi-frequency measurement data into one or more zone; calculate an average absolute impedance over the one or more zones, and select the one or more zones that have a lowest absolute impedance.

Statement 17. The system of statements 11, 12, 14, or 17, wherein the information handling system is further configured identify if the one or more pads are making contact with a borehole wall.

Statement 18. The system of statement 17, wherein the information handling system may be further configured to create an equalize histogram for each of the one or more pads, apply an edge detection to an average response for each of the one or more pads, identify one or more zones from the edge detection, compare an average impedance of one or more zones with each zone, and identify a zone that has an impedance that is 10% or larger than the average impedance.

Statement 19. The system of statement 18, wherein the zone identifies a caving or a washout.

Statement 20. The system of statement 19, wherein the information handling system is further configured use a blob detection algorithm to detect the caving or the washout.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining mud properties comprising:
   taking multi-frequency measurement data with a downhole tool, wherein the downhole tool comprises:
   a mandrel;
   one or more arms attached to the mandrel;
   one or more pads attached to the one or more arms; and
   one or more injector electrodes disposed on the one or more pads; and
   calculating a standard deviation of a normalized response for each of the one or more injector electrodes and selecting an injector electrode from the one or more injector electrodes for the multi-frequency measurement data based at least in part on the standard deviation;
   selecting data from the multi-frequency measurement data with low resistivity or a large standoff;
   creating a forward model based at least partially on the selected data by making initial guesses of model parameters for one or more mud properties;
   performing a cost function minimization with the forward model;
   identifying from the cost function minimization if a misfit is above or below a threshold; and
   identifying the one or more mud properties based at least in part on the cost function minimization.

2. The method of claim 1, where the identifying mud properties are found using an inversion.

3. The method of claim 2, further comprising identifying formation properties with the one or more mud properties during the inversion.

4. The method of claim 1, wherein the selecting an injector electrode from the one or more injector electrodes comprises:
excluding an injector electrode from the one or more injector electrodes with the standard deviation higher than an average standard deviation of the one or more injector electrodes;
calculating an average absolute impedance of the one or more injector electrodes remaining by applying a polynomial fit to calculate the average absolute impedance; and
determining which of the one or more injector electrodes have a highest absolute impedance.

5. The method of claim 4, further comprising determining the highest absolute impedance based at least in part on the polynomial fit.

6. The method of claim 1, wherein the selecting data from the multi-frequency measurement data with low resistivity comprises:
applying an edge detection on the multi-frequency measurement data;
dividing the multi-frequency measurement data into one or more zones;
calculating an average absolute impedance over the one or more zones; and
selecting the one or more zones that have a lowest absolute impedance.

7. The method of claim 1, further comprising identifying if the one or more pads are in contact with a borehole wall.

8. The method of claim 7, wherein the identifying if the one or more pads are in contact with the borehole wall comprises:
creating an equalize histogram for each of the one or more pads;
applying an edge detection to an average response for each of the one or more pads;
identifying one or more zones from the edge detection;
comparing an average impedance of the one or more zones with each zone; and
identifying a zone that has an impedance that is 10% or larger than the average impedance.

9. The method of claim 8, wherein the zone identifies a caving or a washout.

10. The method of claim 9, further comprising using a blob detection algorithm to detect the caving or the washout.

11. A system comprising:
a downhole tool comprising:
a mandrel, wherein the mandrel is a structural support for the downhole tool;
one or more arms, wherein the one or more arms are attached to the mandrel;
one or more pads, wherein the one or more pads are connected to the one or more arms; and
one or more injector electrodes, wherein the one or more injector electrodes are disposed on each of the one or more pads and are configured to take a measurement; and
an information handling system configured to:
calculate a standard deviation of a normalized response for each of the one or more injector electrodes and select an injector electrode from the one or more injector electrodes for multi-frequency measurement data based at least in part on the standard deviation;
select data with low resistivity or a large standoff;
create a forward model by making initial guesses of model parameters for one or more mud properties;
perform a cost function minimization with the forward model;
identify from the cost function minimization if a misfit is above or below a threshold; and
identify the one or more mud properties based at least in part on the cost function minimization.

12. The system of claim 11, where the one or more mud properties are found using an inversion.

13. The system of claim 12, wherein the information handling system is further configured to identify formation properties with the one or more mud properties during the inversion.

14. The system of claim 11, wherein the information handling system is further configured to:
exclude an injector electrode from the one or more injector electrodes with the standard deviation higher than an average standard deviation of the one or more injector electrodes;
calculate an average absolute impedance of the one or more injector electrodes remaining by applying a polynomial fit to calculate the average absolute impedance;
apply a polynomial fit to calculate the average absolute impedance; and
determine which of the one or more injector electrodes have a highest absolute impedance.

15. The system of claim 14, wherein the information handling system is further configured to determine the highest absolute impedance based at least in part on the polynomial fit.

16. The system of claim 11, wherein the information handling system is further configured to:
apply an edge detection on the multi-frequency measurement data;
divide the multi-frequency measurement data into one or more zone;
calculate an average absolute impedance over the one or more zones; and
select the one or more zones that have a lowest absolute impedance.

17. The system of claim 11, wherein the information handling system is further configured identify if the one or more pads are making contact with a borehole wall.

18. The system of claim 17, wherein the information handling system is further configured to:
create an equalize histogram for each of the one or more pads;
apply an edge detection to an average response for each of the one or more pads;
identify one or more zones from the edge detection;
compare an average impedance of one or more zones with each zone; and
identify a zone that has an impedance that is 10% or larger than the average impedance.

19. The system of claim 18, wherein the zone identifies a caving or a washout.

20. The system of claim 19, wherein the information handling system is further configured use a blob detection algorithm to detect the caving or the washout.

21. A method for determining mud properties comprising:
taking multi-frequency measurement data with a downhole tool, wherein the downhole tool comprises:
a mandrel;

one or more arms attached to the mandrel;
one or more pads attached to the one or more arms; and
one or more injector electrodes disposed on the one or more pads; and
selecting an injector electrode from the one or more injector electrodes for the multi-frequency measurement data, wherein the selecting an injector electrode from the one or more injector electrodes comprises:
calculating a standard deviation of a normalized response for each of the one or more injector electrodes;
excluding an injector electrode from the one or more injector electrodes with the standard deviation higher than an average standard deviation of the one or more injector electrodes;
calculating an average absolute impedance of the one or more injector electrodes remaining by applying a polynomial fit to calculate the average absolute impedance; and
determining which of the one or more injector electrodes have a highest absolute impedance;
selecting data from the multi-frequency measurement data with low resistivity or a large standoff;
creating a forward model based at least partially on the selected data by making initial guesses of model parameters for one or more mud properties;
performing a cost function minimization with the forward model;
identifying from the cost function minimization if a misfit is above or below a threshold; and
identifying the one or more mud properties based at least in part on the cost function minimization.

22. A method for determining mud properties comprising:
taking multi-frequency measurement data with a downhole tool, wherein the downhole tool comprises:
a mandrel;
one or more arms attached to the mandrel;
one or more pads attached to the one or more arms; and
one or more injector electrodes disposed on the one or more pads; and
selecting an injector electrode from the one or more injector electrodes for the multi-frequency measurement data;
selecting data from the multi-frequency measurement data with low resistivity or a large standoff, wherein selecting data from the multi-frequency measurement data with low resistivity comprises:
applying an edge detection on the multi-frequency measurement data;
dividing the multi-frequency measurement data into one or more zones;
calculating an average absolute impedance over the one or more zones; and
selecting the one or more zones that have a lowest absolute impedance;
creating a forward model based at least partially on the selected data by making initial guesses of model parameters for one or more mud properties;
performing a cost function minimization with the forward model;
identifying from the cost function minimization if a misfit is above or below a threshold; and
identifying the one or more mud properties based at least in part on the cost function minimization.

23. A system comprising:
a downhole tool comprising:
a mandrel, wherein the mandrel is a structural support for the downhole tool;
one or more arms, wherein the one or more arms are attached to the mandrel;
one or more pads, wherein the one or more pads are connected to the one or more arms; and
one or more injector electrodes, wherein the one or more injector electrodes are disposed on each of the one or more pads and are configured to take a measurement; and
an information handling system configured to:
select an injector electrode from the one or more injector electrodes for multi-frequency measurement data;
select data with low resistivity or a large standoff;
create a forward model by making initial guesses of model parameters for one or more mud properties;
perform a cost function minimization with the forward model;
identify from the cost function minimization if a misfit is above or below a threshold;
identify the one or more mud properties based at least in part on the cost function minimization;
calculate a standard deviation of a normalized response for each of the one or more injector electrodes;
exclude an injector electrode from the one or more injector electrodes with the standard deviation higher than an average standard deviation of the one or more injector electrodes;
calculate an average absolute impedance of the one or more injector electrodes remaining by applying a polynomial fit to calculate the average absolute impedance;
apply a polynomial fit to calculate the average absolute impedance; and
determine which of the one or more injector electrodes have a highest absolute impedance.

24. A system comprising:
a downhole tool comprising:
a mandrel, wherein the mandrel is a structural support for the downhole tool;
one or more arms, wherein the one or more arms are attached to the mandrel;
one or more pads, wherein the one or more pads are connected to the one or more arms; and
one or more injector electrodes, wherein the one or more injector electrodes are disposed on each of the one or more pads and are configured to take a measurement; and
an information handling system configured to:
select an injector electrode from the one or more injector electrodes for multi-frequency measurement data;
select data with low resistivity or a large standoff;
create a forward model by making initial guesses of model parameters for one or more mud properties;
perform a cost function minimization with the forward model;
identify from the cost function minimization if a misfit is above or below a threshold;
identify the one or more mud properties based at least in part on the cost function minimization; and
apply an edge detection on the multi-frequency measurement data;

divide the multi-frequency measurement data into one or more zone;
calculate an average absolute impedance over the one or more zones; and
select the one or more zones that have a lowest absolute impedance.

* * * * *